Figures 1, 2, 3:
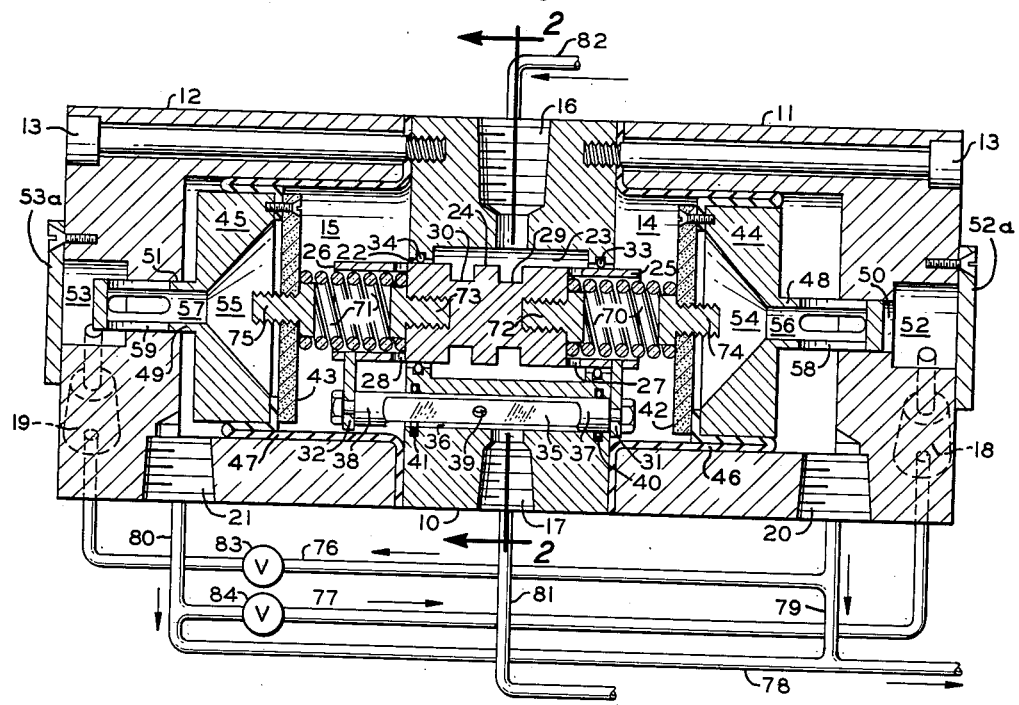

Feb. 19, 1963     M. E. LARKIN     3,077,989
AUTOMATIC SELF CLEANING FILTER APPARATUS
Filed Sept. 5, 1958

INVENTOR.
M. E. LARKIN
BY Hudson & Young
ATTORNEYS

United States Patent Office 3,077,989
Patented Feb. 19, 1963

3,077,989
AUTOMATIC SELF CLEANING FILTER APPARATUS
Mark E. Larkin, Bartlesville, Okla., assignor to Phillips Petroleum Company, a corporation of Delaware
Filed Sept. 5, 1958, Ser. No. 759,197
6 Claims. (Cl. 210—98)

The invention relates to fluid handling. In one aspect, this invention relates to a method for conducting filtration operation in an automatic manner. In another aspect, this invention relates to filtration apparauts for conducting filtering and washing operations automatically in a plurality of filters. In another aspect, this invention relates to shuttle valve apparatus for switching stream flows abruptly in an alternate manner to separate chambers.

In filtration processes, suspended material in the fluid to be filtered is deposited upon the filter element until the filter element becomes so plugged with deposited material that the flow of fluid therethrough is severely restricted. In order to clean the filter element, the flow of fluid to the filter is cut off and a wash fluid is directed to the reverse side of the filter element to dislodge and remove the suspended material deposited on the surface of the filter. Then, the flow wash fluid is cut off and the flow of fluid to be filtered is again directed onto the surface of the filter. Usually the changes from filtration operation to washing operation and back to filtration operation are made on a time basis; that is, after a predetermined period of time has passed, the flow of fluid to be filtered is cut off and the washing operation takes place for a set period of time after which time the flow of wash fluid is cut off and the flow of fluid to be filtered is again started. Where the fluid to be filtered contains varying quantities of suspended material, this method of operation is very inefficient since the washing operation can take place either before the optimum quantity of suspended material has been deposited on the surface of the filter or after the filter has become so clogged with deposited material that the optimum flow of filtered fluid is not obtained.

In many filtration operations, the switching of fluid to be filtered and wash fluid is done automatically and usually electrical means are utilized for operating the necessary valve arrangements. It is desirable in many filtration operations, and particularly where the filtration apparatus is to be used with automatic analyzing instruments, that the filtration apparatus be self-sustaining and free from the need for an outside source of power for controlling the filtration operations.

I have discovered a method and apparatus whereby the difference of pressure on two sides of a movable filter element can be utilized to abruptly switch the flow when the filter element becomes clogged to permit automatic washing of the filter element.

An object of this invention is to provide a method for switching flow to several filters automatically when the pressure differential on opposite sides of a filter reaches a predetermined level as fluid is passed therethrough.

Another object of this invention is to provide a method for conducting filtration operations wherein dirty filters are washed automatically in a manner that deposited material dislodged from the filters cannot be drawn into the stream of the fluid being filtered.

Another object of this invention is to provide a self cleaning filter apparatus adapted for the automatic removal of impurities from a fluid and the automatic removal of deposited material from filters clogged with such impurities.

Another object of this invention is to provide a filter apparatus wherein filtration and washing operations are conducted in a plurality of filter elements automatically in a self sustaining manner independent of an external source of power for switching the flow of fluid to be filtered and the flow of wash fluid.

Another object of this invention is to provide a filtration apparatus in which a reversal of the direction of flow of the fluid through the filtering medium is brought about by a pressure condition built up in the filter during the delivery of fluid thereto.

Another object of this invention is to provide a shuttle valve apparatus adapted to periodically change the flow of fluid alternatively in an abrupt and precise manner.

Another object of this invention is to provide a shuttle valve wherein the switching of flow is dependent upon a characteristic of the fluid flowing therethrough.

Other aspects, objects and advantages of the invention are apparent from a consideration of the accompanying disclosure, drawings and the appended claims.

In accordance with the invention there is provided a filtration apparatus, and method for conducting filtration operations, wherein movable filter elements are moved in accordance with the increase in the differential in pressure on opposite sides of one filter element as suspended material is deposited thereon to thereby store power in an actuating means which abruptly switches the flow of fluid to another filter element when a predetermined power level is reached. The power for switching the flow of fluid is obtained from the actuating means, such as a resilient connecting device disposed between the movable filter element and a shuttle valve means. A tension spring is the preferred actuating means. While a second filter element is filtering fluid, the first filter element is cleaned by the direction of a wash fluid, preferably filtered fluid, against the reverse side of the filter element to dislodge deposited material therefrom. The filtration and washing steps take place automatically as determined by the state of the filter element evidenced by the difference of pressure on its two sides.

Further, in accordance with this invention, there is provided a shuttle valve apparatus wherein flow is switched very abruptly and precisely when the power stored in a resilient actuating means, preferably a spring, is sufficient to overcome the action of a holding means preventing the movement of a shuttle valve element in said shuttle valve apparatus. The displacement of movable diaphragm elements or pistons stretches the spring means to store power therein and said spring means provides the abrupt and quick action effecting switching of the shuttle valve element. The shuttle valve element of the shuttle valve is held in one position by a holding means such as a spring loaded detent means until the power stored in the spring loaded actuating means is sufficient to overcome the holding action of the detent means. The movable diaphragm elements are adapted to permit restricted flow of fluid therethrough and two slide valve elements are used to switch the flow of two flow streams in an alternative manner with the flow path of one stream being through the movable diaphragm elements and the hollow piston rods affixed thereto.

Referring to the drawings, FIGURE 1 is a longitudinal cross sectional view of the filter apparatus of this invention. FIGURE 2 is a cross sectional view taken along the line 2—2 in FIGURE 1. FIGURE 3 is an end view of the apparatus shown in FIGURE 1.

Referring to the drawings, the casing of the filter apparatus comprises slide valve body 10 of circular cross section with end caps 11 and 12 attached on the opposite sides of slide valve body 10 by means of bolts 13. Cap 11 and slide valve body 10 form a first cylindrical filtration chamber 14 enclosed at each end and cap 12 together with slide valve body 10 form a second cylindrical filtration chamber 15 enclosed at each end. Fluid inlet 16 for the introduction of fluid to be filtered and wash fluid outlet 17 for the withdrawal of wash fluid containing suspended material are provided in slide valve body 10. Wash fluid inlets 18 and 19 are provided in the ends of caps 11 and 12, respectively. Filtered fluid outlets 20 and 21 for the withdrawal of filtered fluid are provided in caps 11 and 12, respectively, adjacent the enclosed ends.

Slide valve body 10 is provided with an axially located bore 22 having a center section of somewhat larger diameter forming inlet chamber 23 which is in open communication with flow inlet 16. Slide valve element 24 comprises an elongated cylindrical rod having axial holes drilled in each end to form spring housing 25 at one end and spring housing 26 at the opposite end. A plurality of radially arranged openings 27 and 28 are located adjacent the solid portion of slide valve element 24 through the walls of spring holders 25 and 26, respectively. Circumferentially arranged grooves 29 and 30 are provided at the midpoint of slide valve element 24. Slide valve element 24 is slidably mounted within bore 22 in slide valve body 10 and adapted to be moved or reciprocated in slide valve body 10 so as to protrude alternatively into filtration chambers 14 and 15. The extent of projection into chambers 14 and 15 is limited by support members 31 and 32 affixed to the ends of slide valve element 24. Gaskets 33 and 34 provide pressure sealing relation between inlet chamber 23 and filtration chambers 14 and 15, respectively. Wash slide valve element 35 is located in slide valve body 10 in bore 36 arranged parallel to bore 22. Wash fluid outlet 17 is in open communication with bore 36. Wash slide valve element 35 is milled on opposite sides throughout its length except for small end portions 37 and 38 which are approximately the same diameter as the diameter of bore 36. Hole 39 is drilled at the midpoint of wash slide valve element 35 through the milled sides of wash slide valve element 35. Wash slide valve element 35 is slidably mounted within bore 36 and arranged to reciprocate therein to protrude into filtration chambers 14 and 15 with the movement of slide valve element 35 corresponding to the movement of slide valve element 24 through the attachment of slide valve element 35 to slide valve element 24 by means of support elements 31 and 32 affixed to the respective ends 37 and 38 of slide valve element 35. Gaskets 40 and 41 provide pressure sealing relation between end portions 37 and 38 of slide valve element 35 and slide valve body 10.

Movable filter elements 42 and 43, located respectively in filtration chambers 14 and 15, are mounted on piston filter housings 44 and 45. Long stroke flexible diaphragms 46 and 47 provide pressure sealing relation between piston filter housings 44 and 45 and the internal walls of caps 11 and 12. Piston filter housings 44 and 45 are arranged with piston rods 48 and 49 directed towards the closed ends of caps 11 and 12. Axially located bores 50 and 51 are located in the ends of caps 11 and 12, respectively, for receiving piston rods 48 and 49 when piston filter housings 44 and 45 have been displaced to a position adjacent the enclosed ends of caps 11 and 12. Wash fluid inlet chambers 52 and 53 are provided in the ends of caps 11 and 12, respectively, in open communication with bores 50 and 51 and also in open communication with wash fluid inlets 18 and 19. The faces of piston filter housings 44 and 45 are provided with filtrate receivers 54 and 55 upon which are mounted filter elements 42 and 43. Bores 56 and 57 are drilled longitudinally from the open face of piston filter housings 44 and 45 through piston rods 48 and 49 to a point adjacent the ends of said piston rods. Openings 58 and 59 are radially arranged in piston rods 48 and 49 adjacent the end thereof to provide open communication to bores 56 and 57 within piston rods 48 and 49. The arrangement of openings 58 in piston rod 48 provide a slide valve in combination with bore 50 in the end of cap 11 so as to provide open communication between filtrate receiver 54 and filtration chamber 14 on the one hand and between filtrate receiver 54 and wash fluid inlet chamber 52 on the other. This slide valve arrangement is also present in the construction of piston filter housing 45 within cap 12. Fluid inlet chambers 52 and 53 are sealed by closure 52a and 53a respectively.

Slide valve elements 24 and 35 are held in a fixed position in slide valve body 10 by detent members 60 and 61 as shown in FIGURE 2 of the drawings. Detent members 60 and 61 are both held in place in circumferential groove 29 by the action of springs 62 and 63. Plugs 64 and 65 in turn hold springs 62 and 63 in place and inserts 66 and 67 in combination with gaskets 68 and 69 provide a fluid sealing relation. As shown in the drawings, slide valve elements 24 and 35 project into filtration chamber 15 when detent members 60 and 61 are located in circumferential groove 29. Correspondingly, slide valve elements 24 and 35 will be located or projected into filtration chamber 14 when detent members 60 and 61 are located in circumferential groove 30.

Connection between piston filter housings 44 and 45 with slide valve elements 24 and 35 is provided by tension springs 70 and 71, respectively. Springs 70 and 71 are inserted in spring housing 25 and 26, respectively, with one end of each spring 70 and 71 rigidly fixed to slide valve element 24 by spring retainers 72 and 73, respectively and the opposite ends of each spring rigidly affixed to filter elements 42 and 43 by means of spring retainers 74 and 75. Detent springs 62 and 63 and tension springs 70 and 71 are selected with spring characteristics which permit detent members 60 and 61 to jump from one circumferential groove 29 to the other circumferential groove 30 when openings 58 and 59 in piston rods 48 and 49 are first closed off by bore 50 and bore 51 in the enclosed ends of caps 11 and 12.

The compression force created by detent springs 62 and 63 can be readily adjusted by plugs 64 and 65 to regulate the total force required to move valve element 24 from one position to the other.

Filter fluid outlet 20 is connected to wash fluid inlet 19 by means of conduit 76 and filter fluid outlet 21 is connected to wash fluid inlet 18 by means of conduit 77. Filter fluid outlet conduit 78 is connected to conduit 76 by means of conduit 79 and to conduit 77 by means of conduit 80. Wash fluid conduit 81 is connected to wash fluid outlet 17 and inlet conduit 82 is connected to fluid inlet means 16. Valve 83 in conduit 76 and valve 84 in conduit 77 provide for controlling the proportion of filtered fluid which is utilized as wash fluid for removing deposited material from the filters.

In operation, fluid to be filtered is introduced through fluid inlet 16 into inlet chamber 23 from which it is discharged by means of slide valve element 24 through openings 27 into filtration chamber 14 as shown in FIGURE 1. At the beginning of filtration, filter element 42 is located adjacent to slide valve body 10 but as filtration continues and suspended material is deposited upon filter element 42 the pressure builds up in filtration chamber 14 between slide valve body 10 and the face of filter element 42 to force piston filter housing 44 to move in an outward direction away from slide valve body 10. The fluid collects in filtrate receiver 54 and passes through bore 56 in piston rod 48 and opening 58 into the portion of filtration chamber 14 between piston filter housing 44 and the end of cap 11. The filtered fluid is withdrawn from filtration chamber 14 through filter fluid outlet 20 and conduits 78 and 79.

A portion of the filtered fluid from filtration chamber 14 is directed through conduit 76 into wash fluid inlet 19 and wash fluid inlet chamber 53 from where it is introduced through opening 59 in piston rod 49 into filtrate receiver 55 by means of bore 57 in piston rod 49. This filtered fluid serves to dislodge the suspended material deposited on filter element 43 and carries the suspended material from filtration chamber 15 by flowing through bore 36 in slide valve body 10 and from the apparatus through wash fluid outlet 17. The wash fluid cannot flow into filtration chamber 14 because bore 36 is closed by end 37 of slide valve element 35. Slide valve element 24 prevents the flow of wash fluid into inlet chamber 23.

At this point in the cycle, slide valve elements 24 and 35 as shown in FIGURE 1, project into filtration chamber 15 so that the path of flow for fluid to be filtered is into filtration chamber 14 and the path of flow for wash fluid is from filtration chamber 15. As the filtration continues, piston filter housing 44 is forced away from slide valve body 10 so that tension spring 70 is stretched to store power therein. The compression on detent springs 62 and 63 is adjusted so that detent elements 60 and 61 are released from circumferential groove 29 by the force stored in spring 70 just as openings 58 in piston rod 48 contact the end wall of cap 11 to shut off the path of flow between filtrate receiver 54 and filter fluid outlet 20. With the release of detent elements 60 and 61 tension spring 70 abruptly jerks slide valve elements 24 and 35 into filtration chamber 14 so that slide valve elements 24 and 35 no longer protrude into filtration chamber 15 and detent elements 60 and 61 are seated in circumferential groove 30. In this location of the slide valve elements 24 and 35 the flow of fluid to be filtered has been switched from filtration chamber 14 to filtration chamber 15 through openings 28 in slide valve element 24. Similarly, the flow of washed fluid from filtration chamber 15 has been cut off and a path of flow for the removal of wash fluid from filtration chamber 14 is provided through bore 36 around the end 37 of slide valve element 35. Filtration will continue in filtration chamber 15 until the movement of filter element 43 is sufficient for the power in spring 71 to overcome the holding action of detent springs 62 and 63 holding detent members 60 and 61 in circumferential groove 30. When this point is reached, the slide valve elements again operate to switch the flow to repeat the filtration in filtration chamber 14 and the washing operation in filtration chamber 15.

The proportion of filter fluid used to wash the opposite filter can vary over a wide range as can be readily determined by one skilled in the art. In some operations, where the deposited suspended material is very easily dislodged and the filter is very readily cleaned, valves 83 and 84 are adjusted to provide a minimum flow of filtered fluid for the purpose of washing the filters. In contrast, where the filters are very difficult to clean, a large proportion of the filter fluid is recycled to the opposite filter in order to effect cleaning thereof and the quantity of filtered fluid obtained from the apparatus is reduced. Preferably, a minimum flow of filtered fluid is used for wash purposes since the amount used subtracts from the total amount of filtered fluid obtained from the apparatus.

As shown in the embodiment described in the drawings, pressure sealing relation between caps 11 and 12 with piston filter housings 44 and 45 is provided by long stroke flexible diaphragms 46 and 47. Preferably, these diaphragms are Belofram Company of Massachusetts. Of course, other long stroke diaphragms can be employed. Also, the sealing relation can be obtained by constructing piston filter housings 44 and 45 with piston rings in place of flexible diaphragms 46 and 47; however, it is usually preferred to use flexible diaphragms because the fluid to be filtered usually contains suspended material which may bind the pistons within filtration chambers 14 and 15.

Filtration elements 42 and 43 can be constructed of a variety of materials provided the materials are sufficiently porous to permit the flow of fluid therethrough and sufficiently impervious to prevent the passage of solids therethrough. Suitable filter elements can comprise porous stainless steel, sintered bronze, fabric, paper, Teflon, porous glass, fine mesh wire and ceramics. Preferably, the filter elements are stiff in nature and resist bending; however, it is within the scope of this invention to use flexible filter elements with the attachment of tension springs 70 and 71 to piston filter housings 44 and 45 being secured by means of support members fixed to piston filter housings 44 and 45. If desired, fully flexible diaphragms can be used without the necessity for piston filter housings 44 and 45 by securing the attachment of springs 70 and 71 to a tube at the center of each diaphragm in a manner that the tube replaces piston rods 48 and 49. Of course, further modification of the apparatus of this invention can be devised by those skilled in the art.

In some operations, it will be found desirable to place a pressure regulator in conduit 78 in order to maintain a fixed pressure in fluid flow outlets 20 and 21.

The filtration apparatus of this invention finds particular use in combination with automatic instrumentation for the purpose of removing suspended matter from fluid streams to be analyzed. For example, the filtration apparatus of this invention can be used to remove suspended particles of aluminum chloride catalysts found in an isobutane isomerization effluent or in an isohexane isomerization effluent. Further, the apparatus of this invention can also be employed in connection with internal combustion engines to filter lubricating oil circulating in the engine. Another use of the apparatus of this invention is as a pilot filter employed in combination with large filtration apparatus for controlling the filtration and washing steps of the large size filters. In this latter use, the fluid outlets of the apparatus of this invention are connected with a suitable control system for regulating the filtration and washing operations of a large filter. Other uses of the filtration apparatus of this invention will occur to those skilled in the art.

The apparatus of this invention can be used with fluids in either the gaseous or the vapor form.

Reasonable variation and modification are possible within the scope of the foregoing disclosure, drawings and the claims to the invention, the essence of which is that there have been provided: first, a filtration apparatus, and method for conducting filtration operations, wherein movable filter elements are moved in accordance with the difference in pressure on opposite sides of a filter element to thereby store power in a shuttle valve actuating means which abruptly switches the flow of fluid to the filter elements when a predetermined power level is reached and second, a shuttle valve apparatus wherein flow is switched very abruptly and precisely when the power stored in a resilient actuating means, preferably a spring, is sufficient to overcome the action of a holding means preventing the movement of a slide valve element in said slide valve apparatus.

I claim:
1. A filter apparatus comprising in combination:
a casing having separated first and second chambers therein;
a separate filter means moveably mounted in each of said chambers and dividing its respective chamber in which it is mounted into a first chamber portion and a second chamber portion;
each of said chambers having:
    a first inlet communicating with its said first chamber portion for the introduction of filter feed thereto;
    a first outlet communicating with its said second chamber portion for the withdrawal of filtered fluid therefrom;
    a second inlet communicating with its said second chamber portion for the introduction of wash fluid thereto; and
    a second outlet communicating with its said first chamber portion for withdrawal of used wash fluid therefrom;

first conduit means communicating with said first outlets of each of said chambers to withdraw filtered fluid therefrom; second conduit means communicating with said first conduit means and each of said second inlets for supplying said chambers with filtered fluid to be used as said wash fluid; third conduit means communicating with said second outlets to withdraw used wash liquid from each of said chambers;

flow control means for controlling the opening and closing of each of said inlets and outlets;

shuttle valve means connected to said flow control means to actuate the same and moveably mounted within said casing between said chambers to move between a first position and a second position;

holding means for maintaining said shuttle valve means in its said positions;

and means disposed and connected between said shuttle valve means and each of said filter means for abruptly switching said shuttle valve means from one of its said positions to the other when the buildup of pressure against the said filter means of that said chamber in which filter feed is filtered becomes sufficiently great to overcome the holding action of said holding means;

said shuttle valve means in its said first position causing said flow control means to maintain:
said first inlet and first outlet of said first chamber open;
said second inlet and second outlet of said first chamber closed;
said first inlet and first outlet of said second chamber closed; and
said second inlet and second outlet of said second chamber open;

and said shuttle valve means in its said second position causing said flow control means to maintain said inlets and outlets in open and closed conditions the opposite of that maintained when said shuttle valve means is in its said first position;

whereby filter feed is filtered in one of said chambers while the filter means in the other of said chambers is being washed with said wash fluid.

2. The filter apparatus of claim 1 wherein each of said filter means are attached to an open face piston having a piston rod containing a passageway therethrough for the flow of fluid through said filter means and the open face of said piston and then through the said first outlet when the shuttle valve means is in its said first position and through the said second inlet when the said shuttle valve means is in its said second position, said pistons being mounted within said chambers with said piston rods directed outwardly from said shuttle valve means.

3. The filter apparatus of claim 1 wherein said filter means are attached to an open face piston and a long stroke flexible diaphragm provides pressure sealing relation between said piston and the internal walls of that said chamber in which the latter filter means is mounted.

4. The filter apparatus of claim 1 wherein said flow control means controlling flow through said first inlets comprises a first slide valve element slidably adapted to open and close said first inlets for the introduction of fluid to be filtered into said chambers, and said flow control means controlling flow through said second outlets comprises a second slide valve element adapted to open and close said second outlets for the withdrawal of said used wash fluid from said chambers.

5. The filter apparatus of claim 2 wherein first outlets from said chambers are provided adjacent the closed ends of said casing and wherein the ends of said piston rods are adapted to form a valve means with the closed ends of said casing for the flow of filtered fluid through said piston rods and out said first outlets when said pistons are positioned away from the closed ends of said casing and for the flow of wash fluid from said second inlets into said piston rods when said piston rods are positioned adjacent the closed ends of said casing, the latter-mentioned valve means comprising said flow control means controlling the flow through said first outlets and second inlets.

6. The filter apparatus of claim 5 wherein open communication between said first outlets of one of said chambers and said second inlets of the other of said chambers is provided by conduit means for the circulation of filtered fluid from said one chamber to said other chamber for washing the filter means in the latter.

References Cited in the file of this patent
UNITED STATES PATENTS

| | | |
|---|---|---|
| 1,171,611 | Hauer | Feb. 15, 1916 |
| 1,784,103 | Lowen | Dec. 9, 1930 |
| 2,434,427 | Muller | Jan. 13, 1948 |
| 2,679,320 | Walton | May 25, 1954 |